US012040111B2

(12) United States Patent
Nagai et al.

(10) Patent No.: US 12,040,111 B2
(45) Date of Patent: Jul. 16, 2024

(54) MULTILAYER COIL COMPONENT

(71) Applicant: TDK CORPORATION, Tokyo (JP)

(72) Inventors: Yusuke Nagai, Tokyo (JP); Takashi Suzuki, Tokyo (JP); Kazuhiro Ebina, Tokyo (JP); Kouichi Kakuda, Tokyo (JP); Kunihiko Kawasaki, Tokyo (JP); Shinichi Kondo, Tokyo (JP); Shinichi Sato, Tokyo (JP); Seiichi Nakagawa, Tokyo (JP); Mitsuharu Koike, Tokyo (JP); Kazuhiro Miura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 498 days.

(21) Appl. No.: 17/486,258

(22) Filed: Sep. 27, 2021

(65) Prior Publication Data

US 2022/0102038 A1 Mar. 31, 2022

(30) Foreign Application Priority Data

Sep. 28, 2020 (JP) ................................ 2020-162223

(51) Int. Cl.
*H01F 1/28* (2006.01)
*H01F 5/00* (2006.01)

(52) U.S. Cl.
CPC ............... *H01F 1/28* (2013.01); *H01F 5/003* (2013.01)

(58) Field of Classification Search
CPC ............... H01F 1/28; H01F 1/36; H01F 5/003
USPC ........................................................ 336/200
See application file for complete search history.

(56) References Cited

U.S. PATENT DOCUMENTS 11,646,146 B2 * 5/2023 Lee ........................ H01F 27/327 336/200
11,887,770 B2 * 1/2024 Song ..................... H01F 27/292
2015/0340149 A1 11/2015 Lee et al.
2016/0180995 A1 * 6/2016 Park .......................... H01F 3/10 29/606
2018/0166199 A1 6/2018 Hachiya et al.
2018/0211762 A1 * 7/2018 Jung ..................... H01F 27/292
2020/0303117 A1 9/2020 Sato et al.
2020/0312526 A1 * 10/2020 Yamamoto .............. H01F 27/29
(Continued)

FOREIGN PATENT DOCUMENTS

JP 2018-098278 A 6/2018
JP 2020-155702 A 9/2020
KR 102004791 B1 7/2019

*Primary Examiner* — Shawki S Ismail
*Assistant Examiner* — Joselito S. Baisa
(74) *Attorney, Agent, or Firm* — Oliff PLC

(57) ABSTRACT

A multilayer coil component includes an element body containing a plurality of metal magnetic particles and a resin existing between the plurality of metal magnetic particles and a coil disposed in the element body and configured to include a plurality of electrically interconnected coil conductors. At least one of the plurality of coil conductors has a spiral shape and has conductor portions adjacent to each other when viewed from a direction along a coil axis of the coil. The conductor portion includes a straight conductor portion extending in a straight line and a connecting conductor portion connecting the straight conductor portion and constituting a corner portion of the coil conductor. The metal magnetic particles between the connecting conductor portions adjacent to each other are lower in density than the metal magnetic particles between the straight conductor portions adjacent to each other.

12 Claims, 7 Drawing Sheets

(56) References Cited

U.S. PATENT DOCUMENTS

| | | | | |
|---|---|---|---|---|
| 2021/0134506 | A1 | 5/2021 | Hachiya et al. | |
| 2021/0210272 | A1* | 7/2021 | Song | H01F 27/255 |

* cited by examiner

MULTILAYER COIL COMPONENT

TECHNICAL FIELD

The present invention relates to a multilayer coil component.

BACKGROUND

A multilayer coil component including an element body and a plurality of spiral coil conductors is known (see, for example, Japanese Unexamined Patent Publication No. 2018-98278). The element body contains a plurality of metal magnetic particles and a resin existing between the plurality of metal magnetic particles.

SUMMARY

The spiral coil conductor includes a straight conductor portion extending in a straight line and a connecting conductor portion connecting the straight conductor portion and constituting a corner portion of the coil conductor. In the corner portion of the coil conductor, magnetic flux concentration leads to magnetic saturation, and then a decline in direct current superimposition characteristics may arise.

An object of one aspect of the present invention is to provide a multilayer coil component capable of improving direct current superimposition characteristics.

A multilayer coil component according to one aspect of the present invention includes an element body containing a plurality of metal magnetic particles and a resin existing between the plurality of metal magnetic particles and a coil disposed in the element body and configured to include a plurality of electrically interconnected coil conductors, in which at least one of the plurality of coil conductors has a spiral shape and has conductor portions adjacent to each other when viewed from a direction along a coil axis of the coil, the conductor portion includes a straight conductor portion extending in a straight line and a connecting conductor portion connecting the straight conductor portion and constituting a corner portion of the coil conductor, and the metal magnetic particles between the connecting conductor portions adjacent to each other are lower in density than the metal magnetic particles between the straight conductor portions adjacent to each other.

In the multilayer coil component according to one aspect of the present invention, the metal magnetic particles between the connecting conductor portions adjacent to each other are lower in density than the metal magnetic particles between the straight conductor portions adjacent to each other. As a result, the magnetic permeability between the connecting conductor portions is low in the multilayer coil component. In other words, the magnetic permeability of the corner portion of the coil conductor is low in the multilayer coil component. Accordingly, in the multilayer coil component, magnetic flux concentration in the corner portion of the coil conductor can be suppressed, and thus the occurrence of magnetic saturation in the corner portion can be suppressed. Accordingly, direct current superimposition characteristics can be improved in the multilayer coil component.

A multilayer coil component according to one aspect of the present invention includes an element body containing a plurality of metal magnetic particles and a resin existing between the plurality of metal magnetic particles and a coil disposed in the element body and configured to include a plurality of electrically interconnected coil conductors, in which at least one of the plurality of coil conductors has a spiral shape and has conductor portions adjacent to each other when viewed from a direction along a coil axis of the coil, the conductor portion includes a straight conductor portion extending in a straight line and a connecting conductor portion connecting the straight conductor portion and constituting a corner portion of the coil conductor, and magnetic permeability between the connecting conductor portions adjacent to each other is lower than magnetic permeability between the straight conductor portions adjacent to each other.

In the multilayer coil component according to one aspect of the present invention, the magnetic permeability between the connecting conductor portions adjacent to each other is lower than the magnetic permeability between the straight conductor portions adjacent to each other. In other words, in the multilayer coil component, the magnetic permeability of the corner portion of the coil conductor is low. Accordingly, in the multilayer coil component, magnetic flux concentration in the corner portion of the coil conductor can be suppressed, and thus the occurrence of magnetic saturation in the corner portion can be suppressed. Accordingly, direct current superimposition characteristics can be improved in the multilayer coil component.

In one embodiment, the plurality of metal magnetic particles contained in the element body may include a plurality of metal magnetic particles having a particle diameter of ⅓ or more and ½ or less of a distance between the straight conductor portions adjacent to each other, and the metal magnetic particles having the particle diameter may be arranged along a facing direction of the straight conductor portions between the straight conductor portions adjacent to each other. The magnetic permeability of the metal magnetic particles having a particle diameter of ⅓ or more of the distance between the straight conductor portions adjacent to each other in the facing direction is higher than the magnetic permeability of the metal magnetic particles having a particle diameter of less than ⅓ of the distance between the straight conductor portions adjacent to each other in the facing direction. Hereinafter, the distance between the straight conductor portions adjacent to each other in the facing direction will be referred to as "distance between the conductor portions". In the multilayer coil component, the plurality of metal magnetic particles having a particle diameter of ⅓ or more of the distance between the conductor portions are arranged along the facing direction between the straight conductor portions, and thus the magnetic permeability can be improved. As a result, inductance improvement can be achieved in the multilayer coil component.

The magnetic permeability of the metal magnetic particles having a particle diameter exceeding ½ of the distance between the conductor portions is higher than the magnetic permeability of the metal magnetic particles having a particle diameter of ½ or less of the distance between the conductor portions. However, the metal magnetic particles between the straight conductor portions can be reduced in number in a case where the metal magnetic particles having a particle diameter exceeding ½ of the distance between the conductor portions are arranged along the facing direction between the straight conductor portions. The insulation between the straight conductor portions may decline in a case where a small number of metal magnetic particles are arranged along the facing direction of the straight conductor portions between the straight conductor portions. The metal magnetic particles arranged between the straight conductor portions with a particle diameter of ½ or less of the distance between the conductor portions tend to be larger in number than the metal magnetic particles arranged between the straight conductor portions with a particle diameter exceeding ½ of the distance between the conductor portions. Accordingly, the insulation between the straight conductor portions can be improved in the multilayer coil component.

In one embodiment, an area of a region where the metal magnetic particles having the particle diameter are arranged along the facing direction may exceed 50% of an area of a region between the straight conductor portions adjacent to each other in the facing direction in a cross section along the facing direction. With this configuration, the insulation between the straight conductor portions can be further improved.

In one embodiment, each of the straight conductor portion and the connecting conductor portion may have a pair of side surfaces facing each other in the facing direction. Surface roughness of the pair of side surfaces may be less than 40% of an average particle diameter of the plurality of metal magnetic particles contained in the element body. The Q characteristic of the multilayer coil component depends on the resistance component of the coil conductor. In a high frequency region, an electric current (signal) is likely to flow near the surface of the coil conductor due to the skin effect. Accordingly, the Q characteristic of the multilayer coil component declines as the resistance component on and near the surface of the conductor portion increases. Hereinafter, the resistance component on and near the surface of the conductor portion will be referred to as "surface resistance". In a configuration in which the surface of the conductor portion is uneven, the surface resistance is large because the length of electric current flow is substantially larger than in a configuration in which the surface of the conductor portion is even. In a configuration in which the surface roughness of the pair of side surfaces facing each other in the facing direction is less than 40% of the average particle diameter of the plurality of metal magnetic particles, an increase in surface resistance and a decline in Q characteristic in a high frequency region are suppressed as compared with a configuration in which the surface roughness of the pair of side surfaces is 40% or more of the average particle diameter of the plurality of metal magnetic particles. Accordingly, the multilayer coil component suppresses an increase in surface resistance and a decline in Q characteristic in a high frequency region.

In one embodiment, the plurality of coil conductors may be plated conductors. In a case where the coil conductor is a sintered metal conductor, the coil conductor is formed by a metal component (metal powder) contained in conductive paste being sintered. In this case, the metal magnetic particles bite into the conductive paste in a process preceding the metal component sintering and the surface of the conductive paste becomes uneven due to the shape of the metal magnetic particles. The conductor portion of the formed coil conductor is deformed such that the metal magnetic particles bite into the conductor portion. Accordingly, a configuration in which the coil conductor is a sintered metal conductor significantly increases the surface roughness of the conductor portion of the coil conductor. In contrast, in a case where the coil conductor is a plated conductor, the metal magnetic particles hardly bite into the coil conductor and deformation of the coil conductor is suppressed. Accordingly, the configuration in which the coil conductor is a plated conductor suppresses an increase in the surface roughness of the conductor portion of the coil conductor and an increase in surface resistance.

In one embodiment, the straight conductor portion may include a first conductor portion extending in a straight line along a first direction and a second conductor portion extending in a straight line along a second direction intersecting with the first direction, the first conductor portion may be longer than the second conductor portion, and the metal magnetic particles between the first conductor portions adjacent to each other may be lower in density than the metal magnetic particles between the second conductor portions adjacent to each other. The first conductor portion, which is longer than the second conductor portion, has a coil inner diameter area in a cross section smaller than that of the second conductor portion. Accordingly, magnetic saturation is more likely to occur in the first conductor portion than in the second conductor portion. Accordingly, in the multilayer coil component, it is possible to suppress the occurrence of magnetic saturation in the first conductor portion by causing the metal magnetic particles between the first conductor portions to be lower in density than the metal magnetic particles between the second conductor portions. As a result, the direct current superimposition characteristics can be further improved in the multilayer coil component.

According to one aspect of the present invention, direct current superimposition characteristics can be improved.

DETAILED DESCRIPTION

Figure 1:
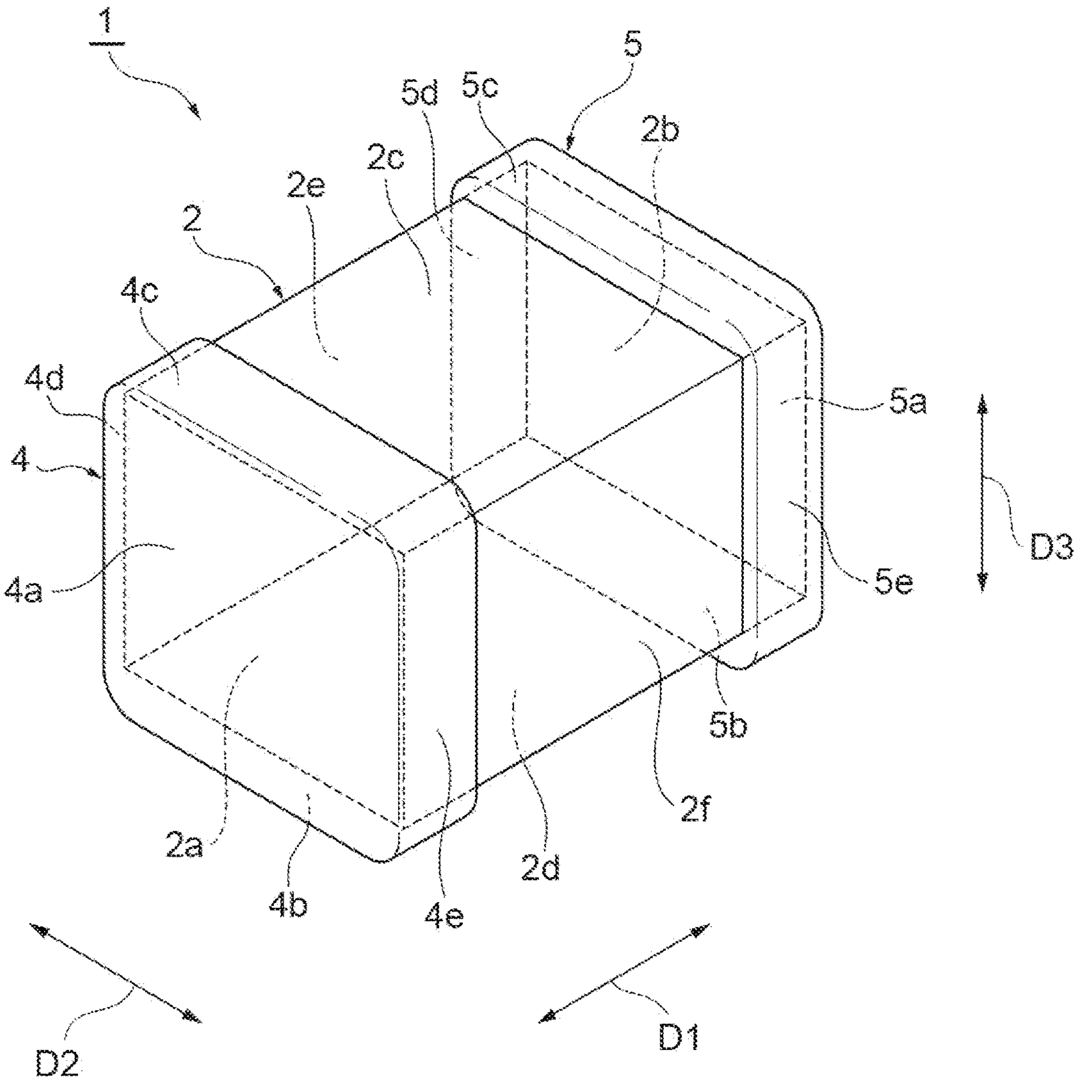
FIG. 1 is a perspective view illustrating a multilayer coil component according to an embodiment.

Hereinafter, a preferred embodiment of the present invention will be described in detail with reference to the accompanying drawings. It should be noted that the same reference numerals will be used for the same or equivalent elements in the description of the drawings with redundant description omitted.

Figure 2:
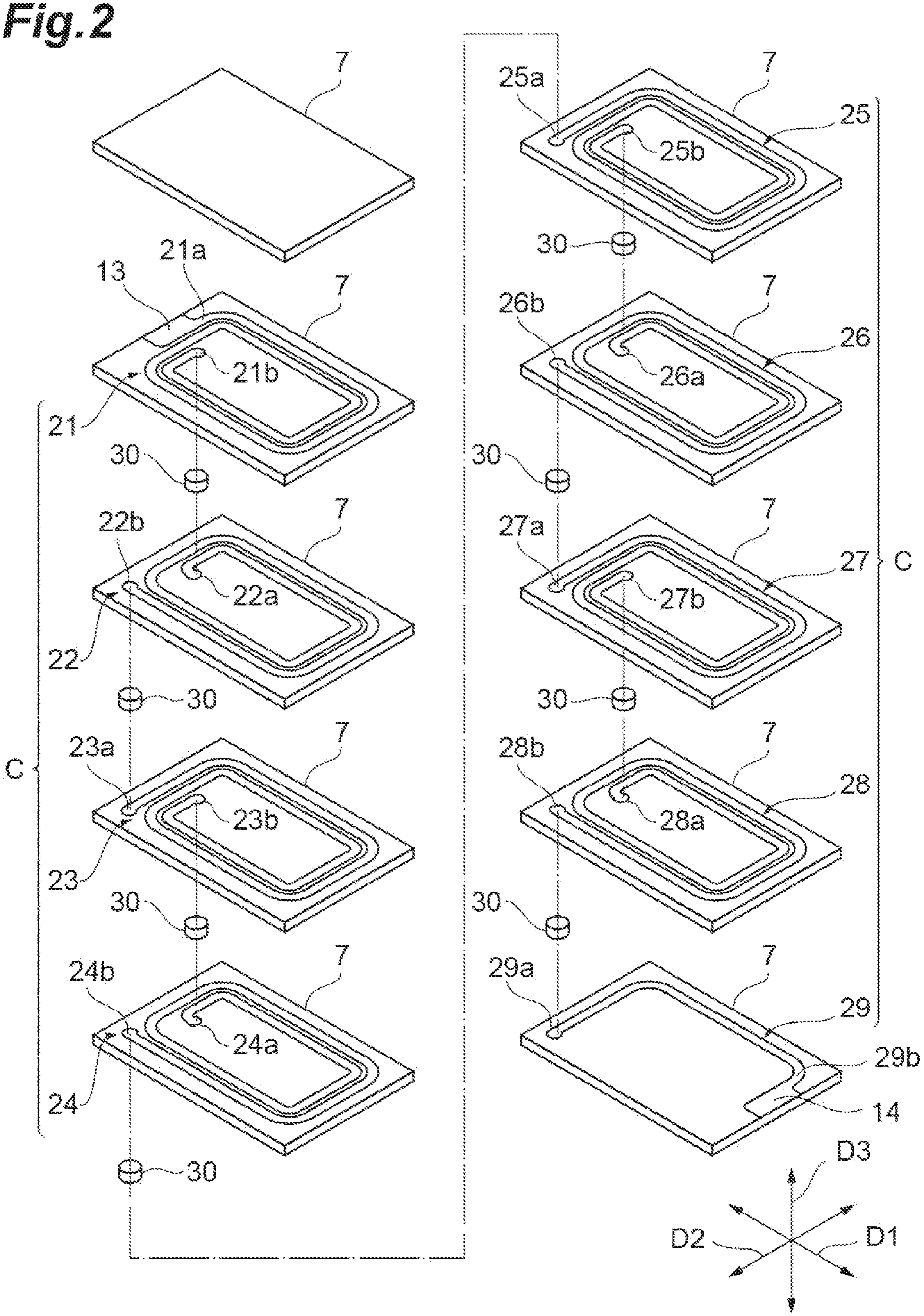
FIG. 2 is an exploded perspective view of the multilayer coil component according to the present embodiment.
Figure 3:
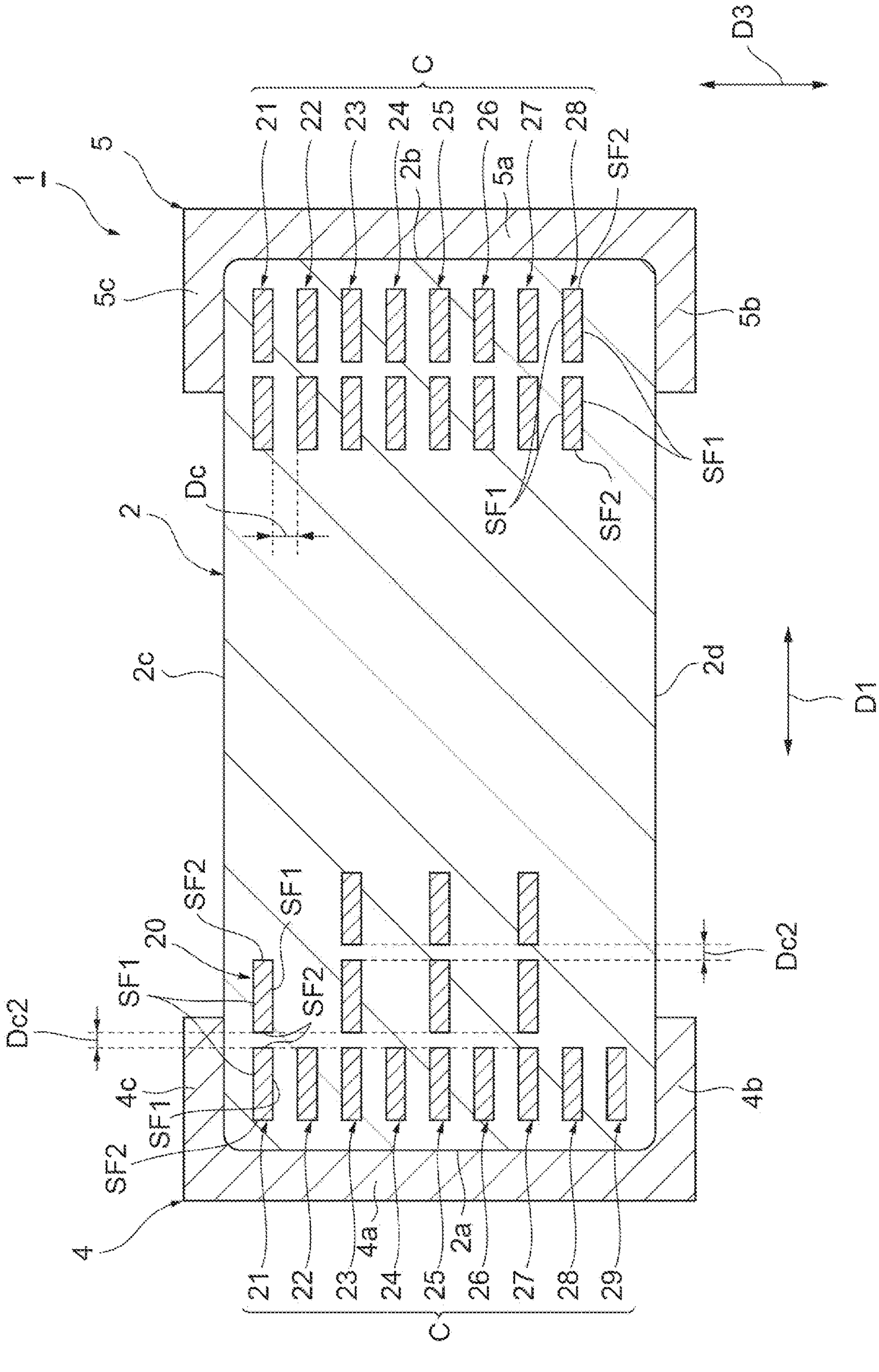
FIG. 3 is a schematic view illustrating a cross-sectional configuration of the multilayer coil component according to the present embodiment.

The configuration of a multilayer coil component 1 according to the present embodiment will be described with reference to FIGS. 1 to 3. FIG. 1 is a perspective view illustrating a multilayer coil component according to the present embodiment. FIG. 2 is an exploded perspective view of the multilayer coil component according to the present embodiment. FIG. 3 is a schematic view illustrating a cross-sectional configuration of the multilayer coil component according to the present embodiment.

As illustrated in FIGS. 1 to 3, the multilayer coil component 1 includes an element body 2 and a pair of external electrodes 4 and 5. The pair of external electrodes 4 and 5 are disposed in both end portions of the element body 2, respectively. The multilayer coil component 1 can be applied to, for example, a bead inductor or a power inductor.

The element body 2 has a rectangular parallelepiped shape. The rectangular parallelepiped shape includes a rectangular parallelepiped shape in which the corner and ridge portions are chamfered and a rectangular parallelepiped shape in which the corner and ridge portions are rounded. The element body 2 has a pair of end surfaces 2*a* and 2*b* facing each other and four side surfaces 2*c*, 2*d*, 2*e*, and 2*f*. The four side surfaces 2*c*, 2*d*, 2*e*, and 2*f* extend in the direction in which the end surface 2*a* and the end surface 2*b* face each other so as to connect the pair of end surfaces 2*a* and 2*b*.

The end surface 2*a* and the end surface 2*b* face each other in a first direction D1. The side surface 2*c* and the side surface 2*d* face each other in a second direction D2. The side surface 2*e* and the side surface 2*f* face each other in a third direction D3. The first direction D1, the second direction D2, and the third direction D3 are substantially orthogonal to each other. The side surface 2*d* is, for example, a surface facing an electronic device when the multilayer coil component 1 is mounted on the electronic device (not illustrated). The electronic device includes, for example, a circuit board or an electronic component. In the present embodiment, the side surface 2*d* is disposed so as to constitute a mounting surface. The side surface 2*d* is a mounting surface.

The element body 2 is configured by a plurality of magnetic body layers 7 being laminated. Each magnetic body layer 7 is laminated in the third direction D3. The element body 2 has the plurality of laminated magnetic body layers 7. In the actual element body 2, the plurality of magnetic body layers 7 are integrated to the extent that the boundary between the layers cannot be visually recognized.

Each magnetic body layer 7 contains a plurality of metal magnetic particles. The metal magnetic particles are made of, for example, a soft magnetic alloy. The soft magnetic alloy is, for example, a Fe—Si-based alloy. In a case where the soft magnetic alloy is the Fe—Si-based alloy, the soft magnetic alloy may contain P. The soft magnetic alloy may be, for example, a Fe—Ni—Si-M-based alloy. “M” contains one or more elements selected from Co, Cr, Mn, P, Ti, Zr, Hf, Nb, Ta, Mo, Mg, Ca, Sr, Ba, Zn, B, Al, and rare earth elements.

In the magnetic body layer 7, the metal magnetic particles are bonded to each other. The metal magnetic particles are bonded to each other by, for example, the oxide films formed on the surfaces of the metal magnetic particles being bonded to each other. In the magnetic body layer 7, the metal magnetic particles are electrically insulated from each other by the oxide films being bonded to each other. The thickness of the oxide film is, for example, 5 to 60 nm or less. The oxide film may be configured by one or more layers. In a case where the oxide film is configured by a plurality of layers, the layers may have the same thickness or may have different thicknesses. The oxide film may contain, for example, an oxide containing at least one of Cr and Al and an oxide containing at least one of Fe, Cr, and Al as main components.

The element body 2 contains a resin. The resin exists between the plurality of metal magnetic particles. The resin is a resin that has electrical insulation (insulating resin). The insulating resin includes, for example, a silicone resin, a phenol resin, an acrylic resin, or an epoxy resin.

The average particle diameter of the metal magnetic particles is 0.5 to 15 μm. In the present embodiment, the average particle diameter of the metal magnetic particles is 5 μm. In the present embodiment, “average particle diameter” means the particle diameter at an integrated value of 50% in a particle size distribution obtained by a laser diffraction/scattering method.

The external electrode 4 is disposed on the end surface 2*a* of the element body 2, and the external electrode 5 is disposed on the end surface 2*b* of the element body 2. In other words, the external electrode 4 and the external electrode 5 are separated from each other in the first direction D1. The external electrodes 4 and 5 have a substantially rectangular shape in a plan view, and the corners of the external electrodes 4 and 5 are rounded. The external electrodes 4 and 5 contain a conductive material. The conductive material is, for example, Ag or Pd. The external electrodes 4 and 5 are configured as sintered bodies of conductive paste. The conductive paste contains conductive metal powder and glass frit. The conductive metal powder is, for example, Ag powder or Pd powder. Plating layers are formed on the surfaces of the external electrodes 4 and 5. The plating layers are formed by, for example, electroplating. The electroplating is, for example, electric Ni plating or electric Sn plating.

The external electrode 4 includes five electrode parts. The external electrode 4 includes an electrode part 4*a* positioned on the end surface 2*a*, an electrode part 4*b* positioned on the side surface 2*d*, an electrode part 4*c* positioned on the side surface 2*c*, an electrode part 4*d* positioned on the side surface 2*e*, and an electrode part 4*e* positioned on the side surface 2*f*. The electrode part 4*a* covers the entire surface of the end surface 2*a*. The electrode part 4*b* covers a part of the side surface 2*d*. The electrode part 4*c* covers a part of the side surface 2*c*. The electrode part 4*d* covers a part of the side surface 2*e*. The electrode part 4*e* covers a part of the side surface 2*f*. The five electrode parts 4*a*, 4*b*, 4*c*, 4*d*, and 4*e* are integrally formed.

The external electrode 5 includes five electrode parts. The external electrode 5 includes an electrode part 5*a* positioned on the end surface 2*b*, an electrode part 5*b* positioned on the side surface 2*d*, an electrode part 5*c* positioned on the side surface 2*c*, an electrode part 5*d* positioned on the side surface 2*e*, and an electrode part 5*e* positioned on the side surface 2*f*. The electrode part 5*a* covers the entire surface of the end surface 2*b*. The electrode part 5*b* covers a part of the side surface 2*d*. The electrode part 5*c* covers a part of the side surface 2*c*. The electrode part 5*d* covers a part of the side surface 2*e*. The electrode part 5*e* covers a part of the side surface 2*f*. The five electrode parts 5*a*, 5*b*, 5*c*, 5*d*, and 5*e* are integrally formed.

The multilayer coil component 1 includes a coil 20 and a pair of connecting conductors 13 and 14. The coil 20 is disposed in the element body 2. The coil 20 includes a plurality of coil conductors C. In the present embodiment, the plurality of coil conductors C include nine coil conductors 21 to 29. The coil 20 includes a through-hole conductor 30. The pair of connecting conductors 13 and 14 are also disposed in the element body 2.

The coil conductors C (coil conductors 21 to 29) are disposed in the element body 2. The coil conductors 21 to 29 are separated from each other in the third direction D3. Distances Dc between the coil conductors 21 to 29 that are adjacent to each other in the third direction D3 are equivalent to each other. Alternatively, the distances Dc may be different from each other. A coil axis Ax (see FIG. 4) of the coils 20 that are adjacent to each other in the third direction D3 extends along the third direction D3. The thickness of the coil conductors 21 to 29 is, for example, approximately 5 to 300 μm.

The distance Dc is, for example, 5 to 30 μm. In the present embodiment, the distance Dc is 15 μm. The surface of the coil conductor C (coil conductors 21 to 29) has roughness as described later, and thus the distance Dc changes in accordance with the surface shape of the coil conductor C. Accordingly, the distance Dc is obtained, for example, as follows.

A cross-sectional photograph of the multilayer coil component 1 including each coil conductor C (each of the coil conductors 21 to 29) is acquired. The cross-sectional photograph can be obtained by, for example, taking a cross section at a time when the multilayer coil component 1 is cut on a plane parallel to the pair of end surfaces 2*a* and 2*b* and separated by a predetermined distance from the end surface 2*a*. The plane may be positioned equidistant from the pair of end surfaces 2*a* and 2*b*. The cross-sectional photograph may also be obtained by taking a cross section at a time when the multilayer coil component 1 is cut on a plane parallel to the pair of side surfaces 2*e* and 2*f* and separated by a predetermined distance from the side surface 2*e*. The distances between the coil conductors C that are adjacent to each other in the third direction D3 on the acquired cross-sectional photograph are measured at any plurality of positions. The measurement positions are, for example, "50" in number. The average value of the measured distances is calculated. The calculated average value is the distance Dc.

Figure 4:
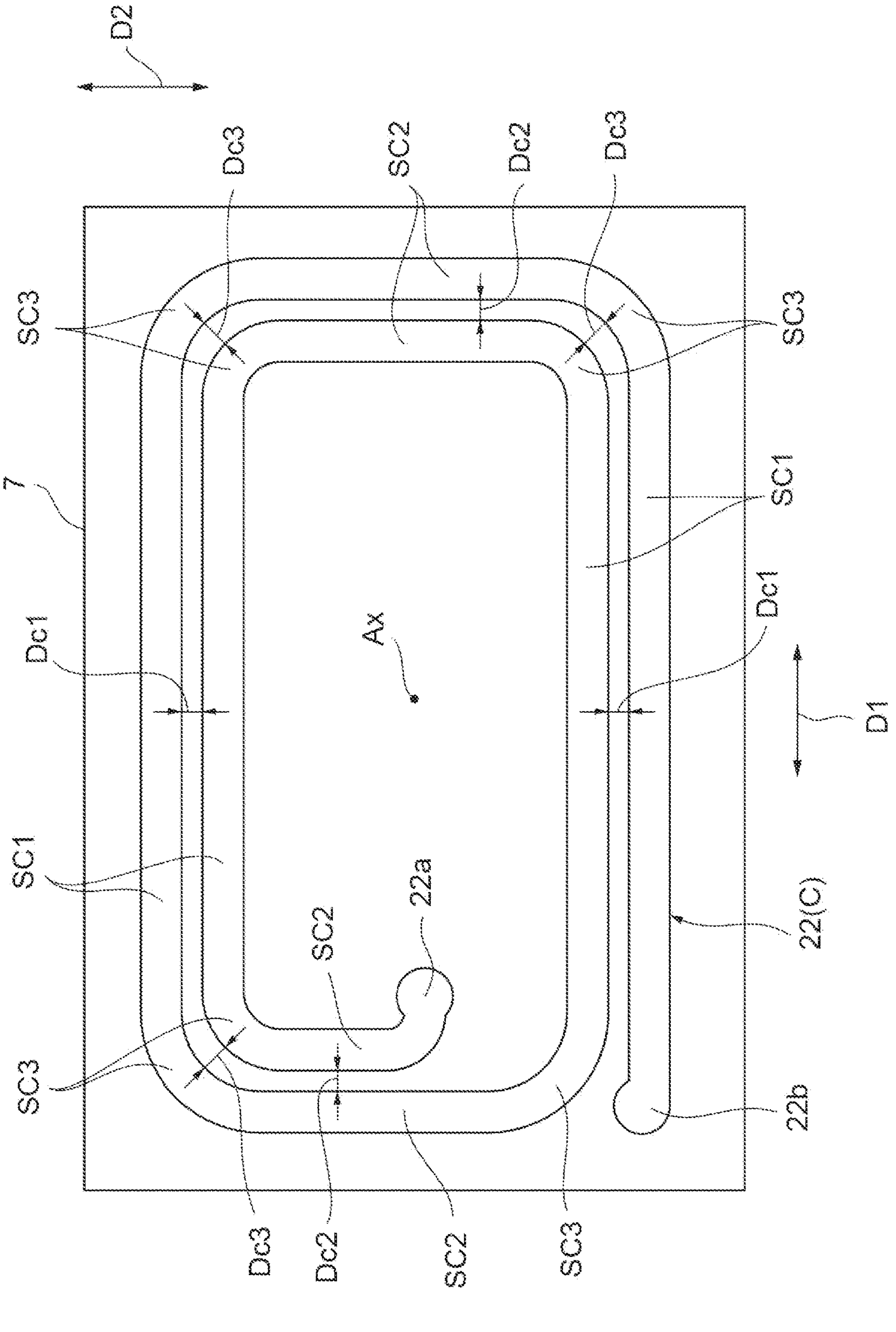
FIG. 4 is a plan view of a coil conductor.

FIG. 4 is a plan view of the coil conductor. The coil conductor 22 is illustrated in FIG. 4. As illustrated in FIGS. 2 and 4, the coil conductor C (coil conductors 21 to 28) constituting the plurality of coil conductors C has a spiral shape when viewed from the third direction D3 (direction along the coil axis Ax). The coil conductor C has a first conductor portion (straight conductor portion) SC1 and a second conductor portion (straight conductor portion) SC2 extending in a straight line and a third conductor portion (connecting conductor portion) SC3 connecting an end portion of the first conductor portion SC1 and an end portion of the second conductor portion SC2.

The first conductor portion SC1 extends along the first direction D1. The first conductor portions SC1 face each other in the second direction D2. The second conductor portion SC2 extends along the second direction D2. The second conductor portions SC2 face each other in the first direction D1. The second conductor portion SC2 is shorter than the first conductor portion SC1. In other words, the first conductor portion SC1 is longer than the second conductor portion SC2. The third conductor portions SC3 constitute the corner portions of the coil conductor C. The third conductor portion SC3 has a curved shape. The third conductor portion SC3 has a predetermined curvature. The side surfaces of the third conductor portion SC3 on the outer and inner sides are parallel to each other. In other words, in the third conductor portion SC3, the curvature of the side surface on the outer side and the curvature of the side surface on the inner side are different from each other. The third conductor portions SC3 face each other in a direction intersecting with the first direction D1 and the second direction D2. The first conductor portion SC1, the second conductor portion SC2, and the third conductor portion SC3 are, for example, approximately 5 to 300 μm in width.

A first distance (inter-conductor portion distance) Dc1 between the adjacent first conductor portions SC1 is equivalent to a second distance (inter-conductor portion distance) Dc2 between the adjacent second conductor portions SC2 (Dc1≅Dc2). Alternatively, the first distance Dc1 and the second distance Dc2 may be different from each other. A third distance (inter-conductor portion distance) Dc3 between the adjacent third conductor portions SC3 is larger than the first distance Dc1 and the second distance Dc2 (Dc3>Dc1, Dc2). The first distance Dc1 between the adjacent first conductor portions SC1 is the distance between the pair of first conductor portions SC1 adjacent to each other in the first direction D1 when viewed from the third direction D3. The first distance Dc1 between the adjacent first conductor portions SC1 is not the distance (distance Dc) between the first conductor portions SC1 adjacent to each other in the third direction D3. The same applies to the second distance Dc2 and the third distance Dc3.

The first distance Dc1 and the second distance Dc2 are, for example, 5 to 30 μm. In the present embodiment, the first distance Dc1 and the second distance Dc2 are 10 μm. The third distance Dc3 is, for example, 8 to 50 μm. In the present embodiment, the third distance Dc3 is 15 μm. The surface of the coil conductor C (coil conductors 21 to 26) has roughness as described later, and thus the first distance Dc1, the second distance Dc2, and the third distance Dc3 change in accordance with the surface shape of the coil conductor C. Accordingly, the first distance Dc1, the second distance Dc2, and the third distance Dc3 are obtained, for example, as follows.

A cross-sectional photograph of the multilayer coil component 1 including the coil conductor C (coil conductors 21 to 28) is acquired. The cross-sectional photograph can be obtained by, for example, taking a cross section at a time when the multilayer coil component 1 is cut with one coil conductor C included on a plane parallel to the side surfaces 2*c* and 2*d* and separated by a predetermined distance from the side surface 2*c* or the side surface 2*d*. The distances between the first to third conductor portions SC1 to SC3 that are adjacent to each other on the acquired cross-sectional photograph are measured at any plurality of positions. The measurement positions are, for example, "50" in number. The average values of the measured distances are calculated. The calculated average values are the first distance Dc1, the second distance Dc2, and the third distance Dc3.

The through-hole conductors 30 are positioned between end portions of the coil conductors 21 to 29 that are adjacent to each other in the third direction D3. The through-hole conductors 30 interconnect the end portions of the coil conductors 21 to 29 adjacent to each other in the third direction D3. The plurality of coil conductors 21 to 29 are electrically connected to each other through the through-hole conductors 30. The end portion of the coil conductor 21 constitutes one end of the coil 20. The end portion of the coil conductor 29 constitutes the other end of the coil 20. The direction of the axial center of the coil 20 is along the third direction D3.

The connecting conductor 13 is connected to the coil conductor 21. The connecting conductor 13 is continuous with the coil conductor 21. The connecting conductor 13 is formed integrally with the coil conductor 21. The connecting conductor 13 interconnects an end portion 21*a* of the coil conductor 21 and the external electrode 4 and is exposed on the end surface 2*a* of the element body 2. The connecting conductor 13 is connected to the electrode part 4*a* of the external electrode 4. The connecting conductor 13 electrically interconnects one end portion of the coil 20 and the external electrode 4.

The connecting conductor 14 is connected to the coil conductor 29. The connecting conductor 14 is continuous with the coil conductor 29. The connecting conductor 14 is formed integrally with the coil conductor 29. The connecting conductor 14 interconnects an end portion 29*b* of the coil conductor 29 and the external electrode 5 and is exposed on the end surface 2*b* of the element body 2. The connecting conductor 14 is connected to the electrode part 5*a* of the external electrode 5. The connecting conductor 14 electrically interconnects the other end portion of the coil 20 and the external electrode 5.

The coil conductor C (coil conductors 21 to 29) and the connecting conductors 13 and 14 are plated conductors. The coil conductor C and the connecting conductors 13 and 14 contain a conductive material. The conductive material is, for example, Ag, Pd, Cu, Al, or Ni. The through-hole conductor 30 contains a conductive material. The conductive material is, for example, Ag, Pd, Cu, Al, or Ni. The through-hole conductor 30 is configured as a sintered body of conductive paste. The conductive paste contains conductive metal powder. The conductive metal powder is, for example, Ag powder, Pd powder, Cu powder, Al powder, or Ni powder. The through-hole conductor 30 may be a plated conductor.

Figure 5A:
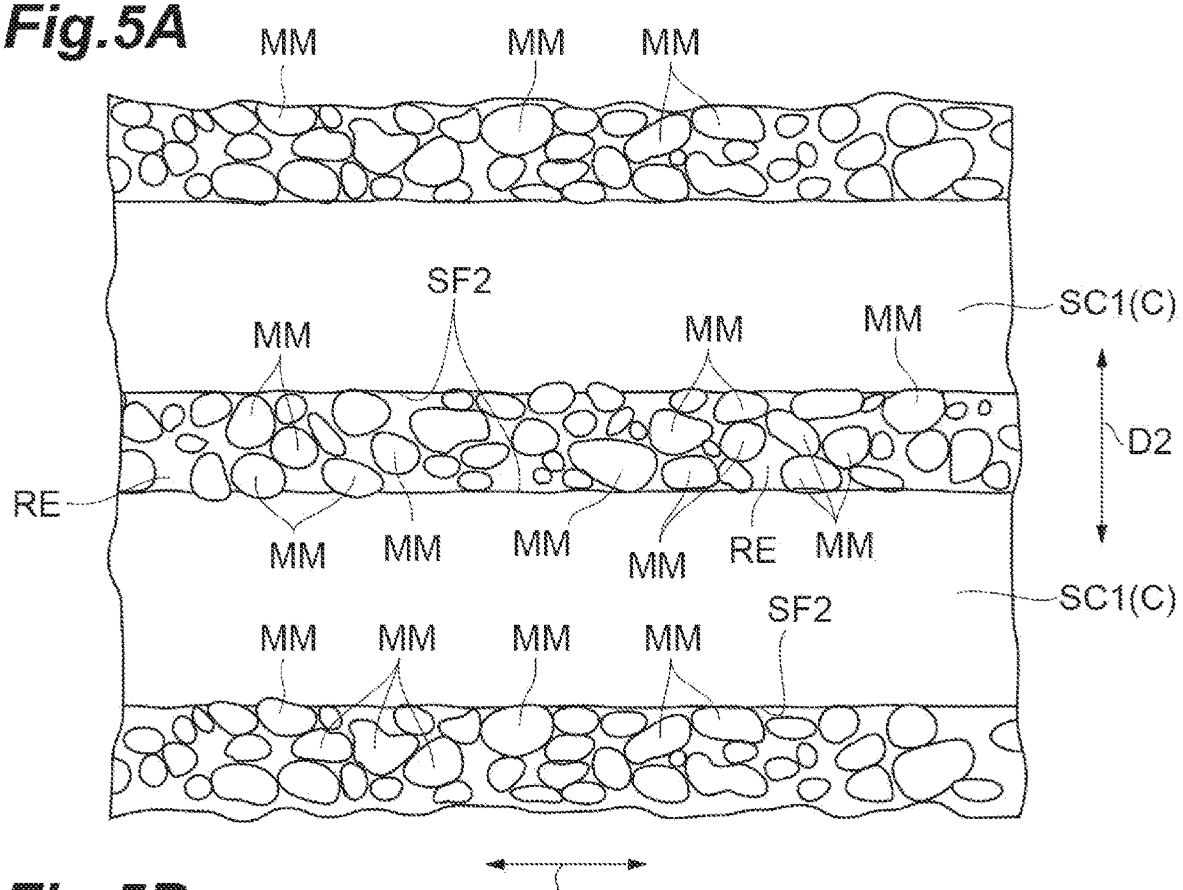
FIG. 5A is a diagram illustrating a cross-sectional configuration of a first conductor portion and metal magnetic particles.
Figure 5B:
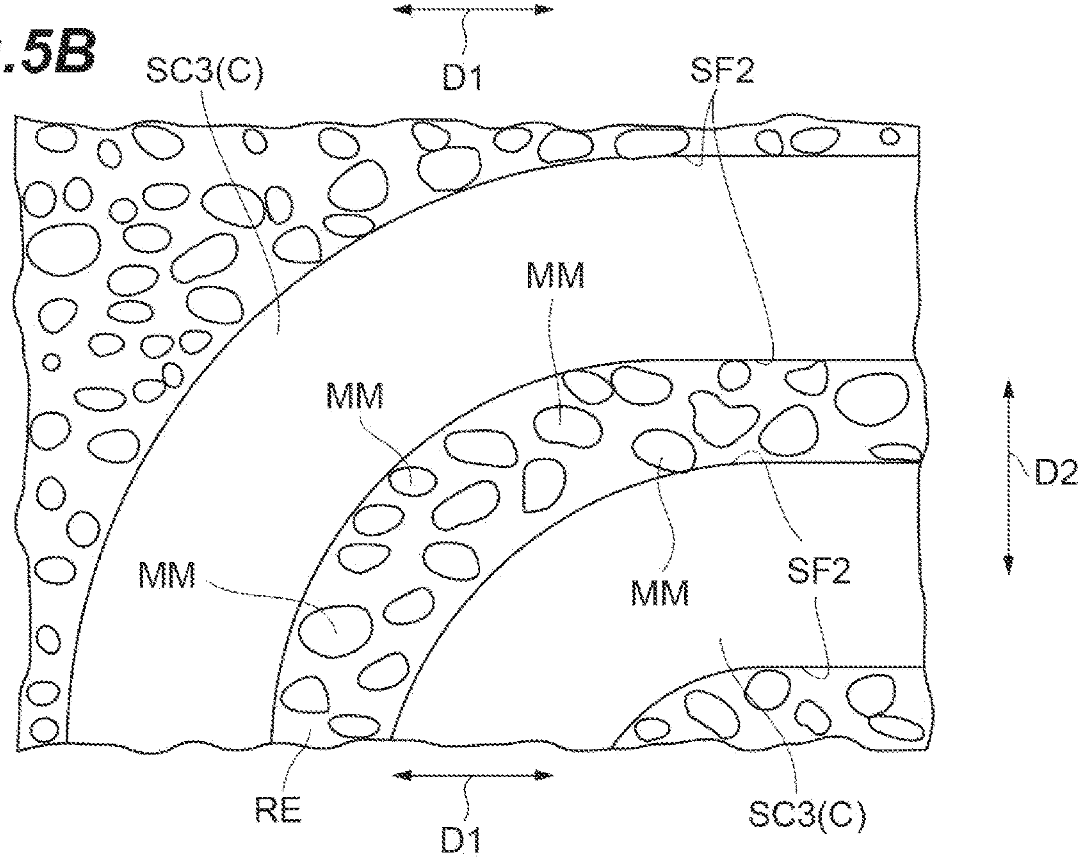
FIG. 5B is a diagram illustrating a cross-sectional configuration of a third conductor portion and metal magnetic particles.

FIG. 5A is a diagram illustrating a cross-sectional configuration of the first conductor portion and metal magnetic particles, and FIG. 5B is a diagram illustrating a cross-sectional configuration of the third conductor portion and the metal magnetic particles.

As illustrated in FIGS. 5A and 5B, the metal magnetic particles between the third conductor portions SC3 adjacent to each other are lower in density than the metal magnetic particles between the first conductor portions SC1 adjacent to each other and between the second conductor portions SC2 adjacent to each other. The metal magnetic particles between the first conductor portions SC1 adjacent to each other are lower in density than the metal magnetic particles between the second conductor portions SC2 adjacent to each other. In other words, the metal magnetic particles between the conductor portions satisfy the following density relationship.

Density of the metal magnetic particles between the third conductor portions SC3<Density of the metal magnetic particles between the first conductor portions SC1<Density of the metal magnetic particles between the second conductor portions SC2

In the present embodiment, the density of the metal magnetic particles between the third conductor portions SC3 is 75% to 97% of the density of the metal magnetic particles between the first conductor portions SC1 adjacent to each other and the density of the metal magnetic particles between the second conductor portions SC2 adjacent to each other. In the present embodiment, the density of the metal magnetic particles is the average density in a predetermined region between the conductor portions. In the present embodiment, the density of the metal magnetic particles is defined as the particle area of the metal magnetic particles in the region between the first conductor portions SC1 adjacent to each other, the region between the second conductor portions SC2 adjacent to each other, and the region between the third conductor portions SC3 adjacent to each other in a predetermined cross section. In other words, the density of the metal magnetic particles is high in a case where the particle area of the metal magnetic particles is large and the density of the metal magnetic particles is low in a case where the particle area of the metal magnetic particles is small.

The particle area of the metal magnetic particles is obtained, for example, as follows.

A cross-sectional photograph of the multilayer coil component 1 including the coil conductor C (coil conductors 21 to 29) and the metal magnetic particles is acquired. As described above, the cross-sectional photograph can be obtained by, for example, taking a cross section at a time when the multilayer coil component 1 is cut with one coil conductor C included on a plane parallel to the side surfaces 2*c* and 2*d* and separated by a predetermined distance from the side surface 2*c* or the side surface 2*d*. The cross-sectional photograph may be the cross-sectional photograph taken in obtaining the first distance Dc1, the second distance Dc2, and the third distance Dc3. The acquired cross-sectional photograph is image-processed using software. By this image processing, the boundary of the metal magnetic particles is determined and the area of the metal magnetic particles is calculated. The average particle area of the metal magnetic particles in the region between the first conductor portions SC1 is calculated from the calculated area of the metal magnetic particles. The average particle areas of the metal magnetic particles in the region between the second conductor portions SC2 and the region between the third conductor portions SC3 can also be obtained by the same method as described above.

The plurality of metal magnetic particles contained in the element body 2 include a plurality of metal magnetic particles MM having a particle diameter of ⅓ or more and ½ or less of the first distance Dc1, the second distance Dc2, and the third distance Dc3. In the present embodiment, the particle diameter of the metal magnetic particles MM is 5.0 to 7.5 μm.

As illustrated in FIG. 5A, the metal magnetic particles MM are arranged along the second direction D2 between the first conductor portions SC1 adjacent to each other in the second direction D2. In other words, the metal magnetic particles MM are arranged along the facing direction of the first conductor portions SC1 between the first conductor portions SC1 adjacent to each other. Likewise, the metal magnetic particles MM are arranged along the facing direction of the second conductor portions SC2 (first direction D1) between the second conductor portions SC2 adjacent to each other.

Figure 6:
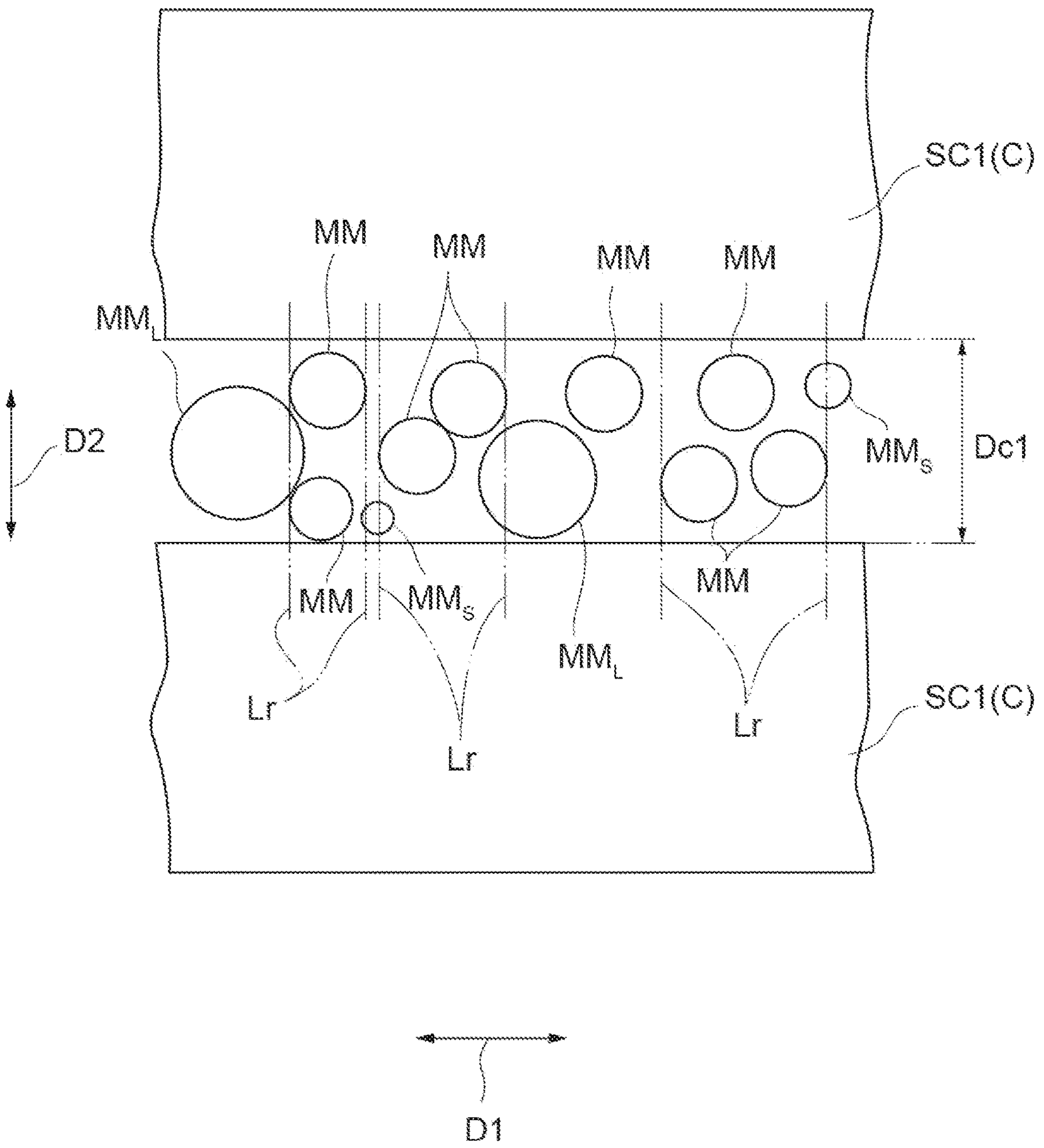
FIG. 6 is a schematic view illustrating a conductor portion and metal magnetic particles.

FIG. 6 is a diagram illustrating a cross-sectional configuration of the conductor portion and the metal magnetic particles. In FIG. 6, the first conductor portion SC1 is illustrated and the hatching representing the cross section is omitted. The arrangement of the metal magnetic particles MM along the second direction D2 includes not only a state where the entire metal magnetic particles MM overlap each other when viewed from the second direction D2 but also a state where the metal magnetic particles MM overlap each other at least in part when viewed from the second direction D2. The same applies to the second conductor portion SC2 and the third conductor portion SC3. The plurality of metal magnetic particles contained in the element body 2 include metal magnetic particles larger in particle diameter than the metal magnetic particles MM and metal magnetic particles smaller in particle diameter than the metal magnetic particles MM. In the present embodiment, the particle diameter is defined as an equivalent circle diameter.

The equivalent circle diameter of the metal magnetic particles is obtained, for example, as follows.

A cross-sectional photograph of the multilayer coil component 1 including the coil conductor C (coil conductors 21 to 29) and the metal magnetic particles is acquired. As described above, the cross-sectional photograph can be obtained by, for example, taking a cross section at a time when the multilayer coil component 1 is cut with one coil conductor C included on a plane parallel to the side surfaces 2*c* and 2*d* and separated by a predetermined distance from the side surface 2*c* or the side surface 2*d*. The cross-sectional photograph may be the cross-sectional photograph taken in obtaining the first distance Dc1, the second distance Dc2, and the third distance Dc3 or the cross-sectional photograph taken in obtaining the average particle area of the metal magnetic particles. The acquired cross-sectional photograph is image-processed using software. By this image processing, the boundary of the metal magnetic particles is determined and the area of the metal magnetic particles is calculated. Each particle diameter converted into the equivalent circle diameter is calculated from the calculated area of the metal magnetic particles.

The region between the first conductor portions SC1 adjacent to each other in the second direction D2 includes the region where the metal magnetic particles MM are arranged along the second direction D2. The region between the first conductor portions SC1 adjacent to each other in the second direction D2 is sandwiched between the first conductor portions SC1 that are close to each other in the second direction D2 and are adjacent to each other. For example, the region between the first conductor portions SC1 is the region between the first conductor portions SC1 that are disposed so as to face each other with the first distance Dc1 in FIG. 4 and is not the region between the first conductor portions SC1 that are disposed so as to face each other across the coil axis Ax. In addition, the region between the first conductor portions SC1 is not the region between the first conductor portions SC1 that are disposed so as to face each other in the third direction D3. The same applies to the region between the second conductor portions SC2 adjacent to each other.

In the cross section along the first direction D1 and the second direction D2, the area of the region where the metal magnetic particles MM are arranged along the second direction D2 exceeds 50% of the area of the region between the first conductor portions SC1 adjacent to each other in the second direction D2. In the region where the metal magnetic particles MM are arranged along the second direction D2, the metal magnetic particles MM may be in contact with each other and the metal magnetic particles MM may not be in contact with each other. The metal magnetic particles larger in particle diameter than the metal magnetic particles MM and the metal magnetic particles smaller in particle diameter than the metal magnetic particles MM are also positioned in the region between the first conductor portions SC1 adjacent to each other in the second direction D2.

The area of the region where the metal magnetic particles MM are arranged along the second direction D2 (facing direction) is obtained, for example, as follows.

A cross-sectional photograph of the multilayer coil component 1 including the coil conductor C (coil conductors 21 to 29) and the metal magnetic particles is acquired. As described above, the cross-sectional photograph can be obtained by, for example, taking a cross section at a time when the multilayer coil component 1 is cut with one coil conductor C included on a plane parallel to the side surfaces 2*c* and 2*d* and separated by a predetermined distance from the side surface 2*c* or the side surface 2*d*. The cross-sectional photograph may be the cross-sectional photograph taken in obtaining the first distance Dc1, the second distance Dc2, and the third distance Dc3, the cross-sectional photograph taken in obtaining the average particle area of the metal magnetic particles, or the cross-sectional photograph acquired in obtaining the equivalent circle diameter of the metal magnetic particles. The acquired cross-sectional photograph is image-processed using software. By this image processing, the boundary of the metal magnetic particles positioned in the region between the first conductor portions SC1 adjacent to each other in the second direction D2 is determined and the area of the metal magnetic particles is calculated. Each particle diameter converted into the equivalent circle diameter is calculated from the calculated area of the metal magnetic particles. Of the metal magnetic particles positioned in the region between the first conductor portions SC1 adjacent to each other in the second direction D2, the metal magnetic particles MM having a particle diameter of ⅓ or more and ½ or less of the first distance Dc1, the second distance Dc2, and the third distance Dc3 are specified.

As illustrated in FIG. 6, a pair of straight lines Lr that are in contact with the plurality of metal magnetic particles MM arranged along the second direction D2 and are parallel to the second direction D2 are defined on the cross-sectional photograph. The area of the region surrounded by the pair of straight lines Lr and the pair of first conductor portions SC1 facing each other in the second direction D2 is calculated. In a case where a plurality of regions are surrounded by the pair of straight lines Lr and the pair of first conductor portions SC1, the sum of the areas of the regions is the area of the region where the metal magnetic particles MM are arranged along the second direction D2. FIG. 6 is a schematic view illustrating the conductor portion and the metal magnetic particles. In FIG. 6, the side surface of the first conductor portion SC1 is illustrated in a straight line and the metal magnetic particles MM are illustrated in a perfect circle so that the description can be understood with ease. As a matter of course, the actual shapes of the first conductor portion SC1 and the metal magnetic particles MM are not limited to the shapes illustrated in FIG. 6. As described above, metal magnetic particles $MM_L$ larger in particle diameter than the metal magnetic particles MM and metal magnetic particles $MM_S$ smaller in particle diameter than the metal magnetic particles MM are also positioned in the region between the first conductor portions SC1.

The area of the region between the first conductor portions SC1 adjacent to each other in the second direction D2 is obtained, for example, as follows.

The cross-sectional photograph acquired in obtaining the area of the region where the metal magnetic particles MM are arranged along the second direction D2 is image-processed using software. By this image processing, the boundary between the first conductor portions SC1 is determined and the area of the region sandwiched by the pair of first conductor portions SC1 facing each other in the second direction D2 is calculated. The region between the second conductor portions SC2 can also be obtained by the same method as described above.

Each coil conductor C (each of the coil conductors 21 to 29) has a pair of side surfaces SF1 as illustrated in FIG. 3. The pair of side surfaces SF1 face each other in the third direction D3. As illustrated in FIGS. 3, 5A and 5B, each coil conductor C has a pair of side surfaces SF2 separate from the pair of side surfaces SF1. The pair of side surfaces SF2 extend so as to connect the pair of side surfaces SF1. Each coil conductor C (first conductor portion SC1, second conductor portion SC2, and third conductor portion SC3) has a substantially quadrangular cross-sectional shape. Each coil conductor C has, for example, a substantially rectangular or substantially trapezoidal cross-sectional shape.

The surface roughness of each side surface SF1 and each side surface SF2 is less than 40% of the average particle diameter of the metal magnetic particles. In the present embodiment, the surface roughness of each side surface SF1 and each side surface SF2 is less than 2 μm. The surface roughness of each side surface SF1 and each side surface SF2 is, for example, 1.0 to 1.8 μm. In this case, the surface roughness of each side surface SF1 and each side surface SF2 is 20 to 36% of the average particle diameter of the metal magnetic particles. The surface roughness of each side surface SF1 and each side surface SF2 may be approximately 0 μm. The surface roughness of each side surface SF1 and the surface roughness of each side surface SF2 may be equal to or different from each other. As also illustrated in FIGS. 5A and 5B, a resin RE exists between the metal magnetic particles. As described above, the resin RE includes, for example, a silicone resin, a phenol resin, an acrylic resin, or an epoxy resin.

The surface roughness of each side surface SF1 of the coil conductor C is obtained, for example, as follows.

A cross-sectional photograph of the multilayer coil component 1 including each coil conductor C (each of the coil conductors 21 to 29) is acquired. As described above, the cross-sectional photograph can be obtained by, for example, taking a cross section at a time when the multilayer coil component 1 is cut on a plane parallel to the pair of end surfaces 2*a* and 2*b* and separated by a predetermined distance from the end surface 2*a*. In this case, the plane may be positioned equidistant from the pair of end surfaces 2*a* and 2*b*. As described above, the cross-sectional photograph may also be obtained by taking a cross section at a time when the multilayer coil component 1 is cut on a plane parallel to the pair of side surfaces 2*e* and 2*f* and separated by a predetermined distance from the side surface 2*e*. The cross-sectional photograph may be the cross-sectional photograph taken in obtaining the distance Dc or the cross-sectional photograph acquired in obtaining the equivalent circle diameter of the metal magnetic particles.

The curve that corresponds to the side surface SF1 on the acquired cross-sectional photograph is represented by a roughness curve. Only a reference length is extracted from the side surface SF1 (roughness curve) on the cross-sectional photograph, and the mountaintop line at the highest peak at the extracted part is obtained. The reference length is, for example, 100 μm. The mountaintop line is orthogonal to the third direction D3 and is a reference line. The extracted part is equally divided by a predetermined number. The predetermined number is, for example, "10". The valley bottom line at the lowest bottom is obtained for each equally divided section. The valley bottom line is also orthogonal to the third direction D3. The gap between the mountaintop line and the valley bottom line in the third direction D3 is measured for each equally divided section. The average value of the measured gaps is calculated. The calculated average value is the surface roughness. The surface roughness is obtained for each side surface SF1 by the procedure described above. The surface roughness may be acquired for each cross-sectional photograph with a plurality of cross-sectional photographs at different positions acquired. In this case, the average value of the acquired surface roughnesses may be the surface roughness.

The surface roughness of each side surface SF2 of the coil conductor C is obtained, for example, as follows.

A cross-sectional photograph of the multilayer coil component 1 including the coil conductor C (coil conductors 21 to 29) is acquired. As described above, the cross-sectional photograph can be obtained by, for example, taking a cross section at a time when the multilayer coil component 1 is cut with one coil conductor C included on a plane parallel to the side surfaces 2*c* and 2*d* and separated by a predetermined distance from the side surface 2*c* or the side surface 2*d*. The cross-sectional photograph may be the cross-sectional photograph taken in obtaining the first distance Dc1, the second distance Dc2, and the third distance Dc3, the cross-sectional photograph acquired in obtaining the equivalent circle diameter of the metal magnetic particles, or the cross-sectional photograph acquired in obtaining the area of the region where the metal magnetic particles MM are arranged along the second direction D2.

The curve that corresponds to the side surface SF2 on the acquired cross-sectional photograph is represented by a roughness curve. Only a reference length is extracted from the side surface SF2 (roughness curve) on the cross-sectional photograph, and the mountaintop line at the highest peak at the extracted part is obtained. The reference length is, for example, 100 μm. The mountaintop line is orthogonal to the first direction D1 or the second direction D2 and is a reference line. The extracted part is equally divided by a predetermined number. The predetermined number is, for example, "10". The valley bottom line at the lowest bottom is obtained for each equally divided section. The valley bottom line is also orthogonal to the first direction D1 or the second direction D2. The gap between the mountaintop line and the valley bottom line in the first direction D1 or the second direction D2 is measured for each equally divided section. The average value of the measured gaps is calculated. The calculated average value is the surface roughness. The surface roughness is obtained for each side surface SF2 by the procedure described above. The surface roughness may be acquired for each cross-sectional photograph with a plurality of cross-sectional photographs at different positions acquired. In this case, the average value of the acquired surface roughnesses may be the surface roughness.

Figure 7:
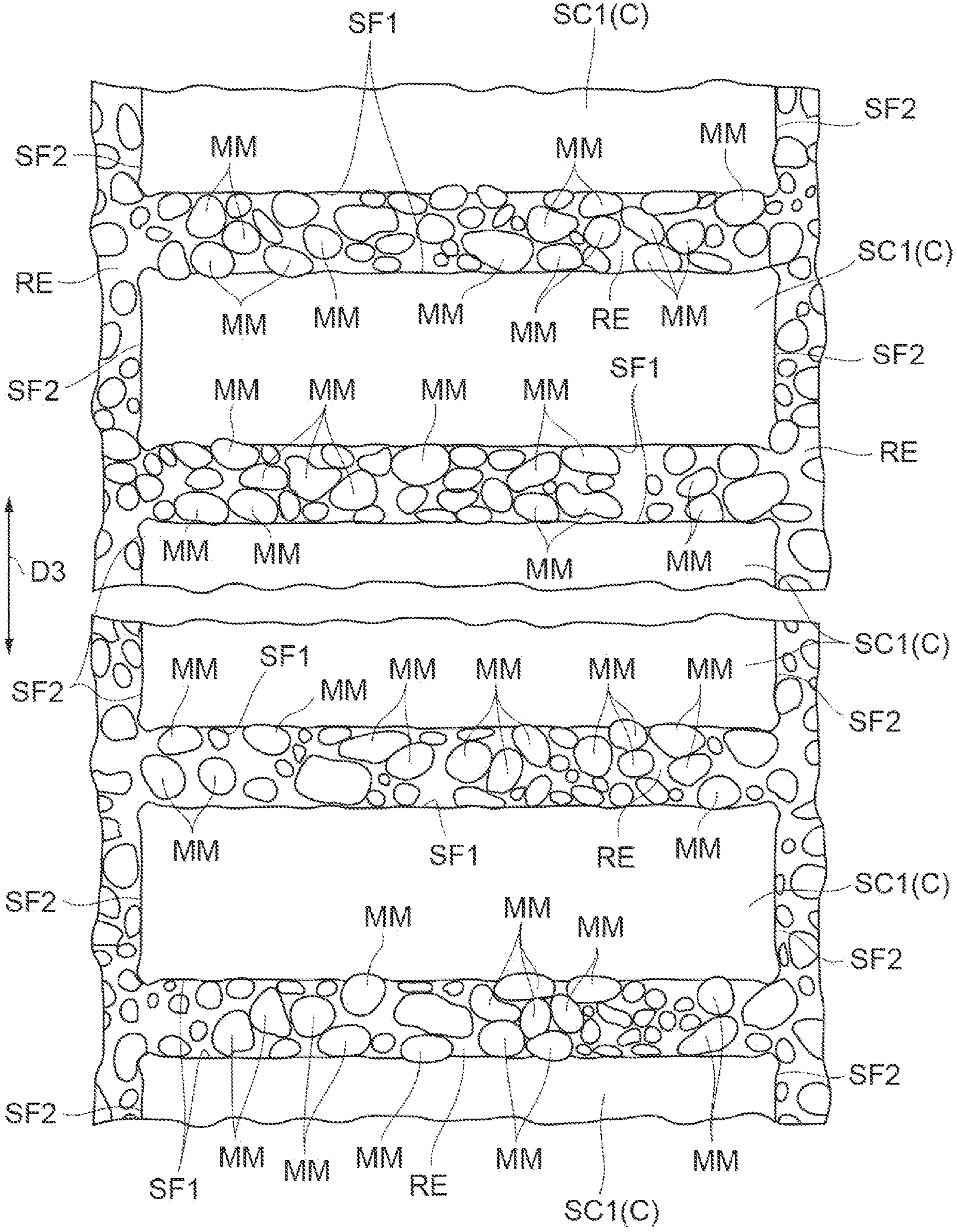
FIG. 7 is a diagram illustrating a cross-sectional configuration of a conductor portion and metal magnetic particles.

FIG. 7 is a diagram illustrating a cross-sectional configuration of the conductor portion and the metal magnetic particles. The first conductor portion SC1 is illustrated in FIG. 7. As illustrated in FIG. 7, in the multilayer coil component 1, the plurality of metal magnetic particles contained in the element body 2 include the plurality of metal magnetic particles MM having a particle diameter of ⅓ or more and ½ or less of the distance Dc between the coil conductors C. The metal magnetic particles MM are arranged along the third direction D3 between the coil conductors C (first conductor portion SC1, second conductor portion SC2, and third conductor portion SC3) adjacent to each other in the third direction D3.

The arrangement of the metal magnetic particles MM along the third direction D3 includes not only a state where the entire metal magnetic particles MM overlap each other when viewed from the third direction D3 but also a state where the metal magnetic particles MM overlap each other at least in part when viewed from the third direction D3. The plurality of metal magnetic particles contained in the element body 2 include metal magnetic particles larger in particle diameter than the metal magnetic particles MM and metal magnetic particles smaller in particle diameter than the metal magnetic particles MM. In the present embodiment, the particle diameter is defined as an equivalent circle diameter. The equivalent circle diameter of the metal magnetic particles can be calculated by the same method as described above.

The region between the coil conductors C adjacent to each other in the third direction D3 includes the region where the metal magnetic particles MM are arranged along the third direction D3. The region between the coil conductors C adjacent to each other in the third direction D3 is sandwiched between the coil conductors C adjacent to each other in the third direction D3 in the element body 2. For example, the region between the coil conductor 21 and the coil conductor 22 is sandwiched between the coil conductor 21 and the coil conductor 22 in the element body 2 and overlaps the coil conductor 21 and the coil conductor 22 as a whole when viewed from the third direction D3. In a cross section along the third direction D3, the area of the region where the metal magnetic particles MM are arranged along the third direction D3 exceeds 50% of the area of the region between the coil conductors C adjacent to each other in the third direction D3. In the region where the metal magnetic particles MM are arranged along the third direction D3, the metal magnetic particles MM may be in contact with each other and the metal magnetic particles MM may not be in contact with each other. The metal magnetic particles larger in particle diameter than the metal magnetic particles MM and the metal magnetic particles smaller in particle diameter than the metal magnetic particles MM are also positioned in the region between the coil conductors C adjacent to each other in the third direction D3.

The area of the region where the metal magnetic particles MM are arranged along the third direction D3 is obtained, for example, as follows. A cross-sectional photograph of the multilayer coil component 1 including each coil conductor C (each of the coil conductors 21 to 29) and the metal magnetic particles is acquired. As described above, the cross-sectional photograph can be obtained by, for example, taking a cross section at a time when the multilayer coil component 1 is cut on a plane parallel to the pair of end surfaces 2*a* and 2*b* and separated by a predetermined distance from the end surface 2*a*. In this case, the plane may be positioned equidistant from the pair of end surfaces 2*a* and 2*b*. As described above, the cross-sectional photograph may also be obtained by taking a cross section at a time when the multilayer coil component 1 is cut on a plane parallel to the pair of side surfaces 2*e* and 2*f* and separated by a predetermined distance from the side surface 2*e*. The cross-sectional photograph may be the cross-sectional photograph taken in obtaining the distance Dc or the cross-sectional photograph acquired in obtaining the equivalent circle diameter of the metal magnetic particles.

The acquired cross-sectional photograph is image-processed using software. By this image processing, the boundary of the metal magnetic particles positioned in the region between the coil conductors C adjacent to each other in the third direction D3 is determined and the area of the metal magnetic particles is calculated. Each particle diameter converted into the equivalent circle diameter is calculated from the calculated area of the metal magnetic particles. Of the metal magnetic particles positioned in the region between the coil conductors C adjacent to each other in the third direction D3, the metal magnetic particles MM having a particle diameter of ⅓ or more and ½ or less of the distance Dc are specified.

A pair of straight lines that are in contact with the plurality of metal magnetic particles MM arranged along the third direction D3 and are parallel to the third direction D3 are defined on the cross-sectional photograph. The area of the region surrounded by the pair of straight lines and the pair of coil conductors C facing each other in the third direction D3 is calculated. In a case where a plurality of regions are surrounded by the pair of straight lines and the pair of coil conductors C, the sum of the areas of the regions is the area of the region where the metal magnetic particles MM are arranged along the third direction D3. As described above, the metal magnetic particles $MM_L$ larger in particle diameter than the metal magnetic particles MM and the metal magnetic particles $MM_S$ smaller in particle diameter than the metal magnetic particles MM are also positioned in the region between the coil conductors C.

The area of the region between the coil conductors C adjacent to each other in the third direction D3 is obtained, for example, as follows. The cross-sectional photograph acquired in obtaining the area of the region where the metal magnetic particles MM are arranged along the third direction D3 is image-processed using software. By this image processing, the boundary between the coil conductors C is determined and the area of the region sandwiched by the pair of coil conductors C facing each other in the third direction D3 is calculated.

Subsequently, a method for manufacturing the multilayer coil component 1 will be described.

Slurry is prepared by mixing metal magnetic particles, an insulating resin, a solvent, and so on. The prepared slurry is applied onto a base material (such as a PET film) by the doctor blade method. A green sheet to become the magnetic body layer 7 is formed as a result. Next, a through hole is formed by laser processing at the position where the through-hole conductor 30 (see FIG. 2) is to be formed on the green sheet.

Subsequently, the through hole in the green sheet is filled with first conductive paste. The first conductive paste is produced by mixing conductive metal powder, a binder resin, and so on. Subsequently, plated conductors to become the coil conductors C and the connecting conductors 13 and 14 are provided on the green sheet. At this time, the plated conductor is connected to the conductive paste in the through hole.

Subsequently, the green sheet is laminated. Here, a plurality of the green sheets provided with the plated conductors are peeled off the base material and laminated and pressure is applied in the lamination direction. A laminate is formed as a result. At this time, the green sheets are laminated such that the plated conductors to become the coil conductors C and the connecting conductors 13 and 14 overlap in the lamination direction.

Subsequently, the green sheet laminate is cut into chips of a predetermined size with a cutting machine. Green chips are obtained as a result. Subsequently, the binder resin contained in each portion is removed from the green chip, and then the green chip is fired. The element body 2 is obtained as a result.

Subsequently, second conductive paste is provided with respect to each of the pair of end surfaces 2*a* and 2*b* of the element body 2. The second conductive paste is produced by mixing conductive metal powder, glass frit, a binder resin, and so on. Subsequently, the second conductive paste is baked onto the element body 2 by heat treatment. The pair of external electrodes 4 and 5 are formed as a result. The surfaces of the pair of external electrodes 4 and 5 are electroplated. The plating layers are formed as a result. The multilayer coil component 1 is obtained as a result of the process described above.

As described above, in the multilayer coil component 1 according to the present embodiment, the metal magnetic particles between the third conductor portions SC3 adjacent to each other are lower in density than the metal magnetic particles between the first conductor portions SC1 adjacent to each other and between the second conductor portions SC2 adjacent to each other. As a result, the magnetic permeability between the third conductor portions SC3 is low in the multilayer coil component 1. In other words, the magnetic permeability of the corner portion of the coil conductor C is low in the multilayer coil component 1. Accordingly, in the multilayer coil component 1, magnetic flux concentration in the corner portion of the coil conductor C can be suppressed, and thus the occurrence of magnetic saturation in the corner portion can be suppressed. Accordingly, direct current superimposition characteristics can be improved in the multilayer coil component 1.

In the multilayer coil component 1 according to the present embodiment, the magnetic permeability of the metal magnetic particles MM having a particle diameter of ⅓ or more of the first distance Dc1, the second distance Dc2, and the third distance Dc3 is higher than the magnetic permeability of the metal magnetic particles having a particle diameter of less than ⅓ of the first distance Dc1, the second distance Dc2, and the third distance Dc3. In the multilayer coil component 1, the plurality of metal magnetic particles MM having a particle diameter of ⅓ or more of the first distance Dc1, the second distance Dc2, and the third distance Dc3 are arranged between the first and second conductor portions SC1 and SC2 (hereinafter, "conductor portions") along the facing directions of the conductor portions, and thus the magnetic permeability can be improved. As a result, inductance improvement can be achieved in the multilayer coil component 1.

The magnetic permeability of the metal magnetic particles having a particle diameter exceeding ½ of the first distance Dc1, the second distance Dc2, and the third distance Dc3 is higher than the magnetic permeability of the metal magnetic particles MM having a particle diameter of ½ or less of the first distance Dc1, the second distance Dc2, and the third distance Dc3. However, the metal magnetic particles between the conductor portions can be reduced in number in a case where the metal magnetic particles having a particle diameter exceeding ½ of the first distance Dc1, the second distance Dc2, and the third distance Dc3 are arranged along the facing direction of the conductor portions between the conductor portions. The insulation between the conductor portions may decline in a case where a small number of metal magnetic particles are arranged along the facing direction of the conductor portions between the conductor portions. The metal magnetic particles MM arranged between the conductor portions with a particle diameter of ½ or less of the first distance Dc1, the second distance Dc2, and the third distance Dc3 tend to be larger in number than the metal magnetic particles arranged between the conductor portions with a particle diameter exceeding ½ of the first distance Dc1, the second distance Dc2, and the third distance Dc3. Accordingly, the insulation between the conductor portions can be improved in the multilayer coil component 1.

The metal magnetic particles arranged between the conductor portions with a particle diameter of less than ⅓ of the first distance Dc1, the second distance Dc2, and the third distance Dc3 tend to be larger in number than the metal magnetic particles MM arranged between the conductor portions with a particle diameter of ⅓ or more of the first distance Dc1, the second distance Dc2, and the third distance Dc3. However, the gap formed between the metal magnetic particles (metal magnetic particles MM) is smaller in a case where the metal magnetic particles having a particle diameter of less than ⅓ of the first distance Dc1, the second distance Dc2, and the third distance Dc3 are arranged between the conductor portions than in a case where the metal magnetic particles MM having a particle diameter of ⅓ or more of the first distance Dc1, the second distance Dc2, and the third distance Dc3 are arranged between the conductor portions. Accordingly, the resin RE is unlikely to exist between the metal magnetic particles and a decline in insulation between the conductor portions may arise. In the multilayer coil component 1, the plurality of metal magnetic particles MM having a particle diameter of ⅓ or more of the first distance Dc1, the second distance Dc2, and the third distance Dc3 are arranged along the facing direction of the conductor portions between the conductor portions, and thus the resin RE is likely to exist between the metal magnetic particles MM and a decline in insulation between the conductor portions is unlikely to arise. As a result, the multilayer coil component 1 is capable of improving the insulation between the conductor portions.

In the multilayer coil component 1 according to the present embodiment, the area of the region where the metal magnetic particles having a particle diameter are arranged along the facing direction exceeds 50% of the area of the region between the conductor portions adjacent to each other in the facing direction in a cross section along the facing direction of the conductor portions. With this configuration, the insulation between the conductor portions can be further improved.

The Q characteristic of the multilayer coil component 1 depends on the resistance component of the coil conductor C (coil conductors 21 to 29). In a high frequency region, an electric current (signal) is likely to flow near the surface of the coil conductor C due to the skin effect. Accordingly, the Q characteristic of the multilayer coil component 1 declines as the surface resistance of the coil conductor C (conductor portion) increases. In a configuration in which the surface of the coil conductor C is uneven, the surface resistance is large because the length of electric current flow is substantially larger than in a configuration in which the surface of the coil conductor C is even. In a configuration in which the surface roughness of each side surface SF1 and each side surface SF2 is less than 40% of the average particle diameter of the metal magnetic particles MM, an increase in surface resistance and a decline in Q characteristic in a high frequency region are suppressed as compared with a configuration in which the surface roughness of each side surface SF1 and each side surface SF2 is 40% or more of the average particle diameter of the metal magnetic particles MM. Accordingly, the multilayer coil component 1 suppresses an increase in surface resistance and a decline in Q characteristic in a high frequency region.

In the multilayer coil component 1 according to the present embodiment, the coil conductor C (coil conductors 21 to 29) is a plated conductor. In a case where the coil conductor is a sintered metal conductor, the coil conductor is formed by a metal component (metal powder) contained in conductive paste being sintered. In this case, the metal magnetic particles bite into the conductive paste in a process preceding the metal component sintering and the surface of the conductive paste becomes uneven due to the shape of the metal magnetic particles. In a case where the coil conductor is a sintered metal conductor, the coil conductor is deformed such that the metal magnetic particles bite into the coil conductor. Accordingly, a configuration in which the coil conductor is a sintered metal conductor significantly increases the surface roughness of the coil conductor.

In contrast, in a case where the coil conductor C is a plated conductor, the metal magnetic particles MM hardly bite into the coil conductor C (conductor portion) as illustrated in FIG. 5A and deformation of the coil conductor C is suppressed. Accordingly, the configuration in which the coil conductor C is a plated conductor suppresses an increase in the surface roughness of the coil conductor C and an increase in surface resistance.

In the multilayer coil component 1 according to the present embodiment, the conductor portion of the coil conductor C includes the first conductor portion SC1 extending in a straight line along the first direction D1, the second conductor portion SC2 extending in a straight line along the second direction D2 intersecting with the first direction D1, and the third conductor portion SC3 connecting the first conductor portion SC1 and the second conductor portion SC2 and constituting the corner portion of the coil conductor C. The third distance Dc3 between the third conductor portions SC3 adjacent to each other exceeds the first distance Dc1 between the first conductor portions SC1 adjacent to each other and the second distance Dc2 between the second conductor portions SC2 adjacent to each other. When the green sheet is laminated and pressurized with the coil conductor C formed in the process of manufacturing the multilayer coil component 1, it is difficult to uniformly apply pressure to the corner portions of the coil conductor C, and thus metal magnetic particles tend to be difficult to enter between the third conductor portions SC3 constituting the corner portions of the coil conductor C. As a result, the metal magnetic particles between the third conductor portions SC3 decrease in number and the insulation between the third conductor portions SC3 may decline. In the multilayer coil component 1, it is possible to suppress the decline in the insulation between the third conductor portions SC3 by increasing the distance between the third conductor portions SC3.

In the multilayer coil component 1 according to the present embodiment, the coil conductor C includes the first conductor portion SC1 extending in a straight line along the first direction D1 and the second conductor portion SC2 extending in a straight line along the second direction D2. The first conductor portion SC1 is longer than the second conductor portion SC2. The metal magnetic particles between the second conductor portions SC2 adjacent to each other are lower in density than the metal magnetic particles between the first conductor portions SC1 adjacent to each other. The first conductor portion SC1, which is longer than the second conductor portion SC2, has a coil inner diameter area in a cross section smaller than that of the second conductor portion SC2. Accordingly, magnetic saturation is more likely to occur in the first conductor portion SC1 than in the second conductor portion SC2. Accordingly, in the multilayer coil component 1, it is possible to suppress the occurrence of magnetic saturation in the first conductor portion SC1 by causing the metal magnetic particles between the first conductor portions SC1 to be lower in density than the metal magnetic particles between the second conductor portions SC2. As a result, the direct current superimposition characteristics can be further improved in the multilayer coil component 1.

In the multilayer coil component 1 according to the present embodiment, the magnetic permeability of the metal magnetic particles MM having a particle diameter of ⅓ or more of the distance Dc is higher than the magnetic permeability of the metal magnetic particles having a particle diameter of less than ⅓ of the distance Dc. In the multilayer coil component 1, the plurality of metal magnetic particles MM having a particle diameter of ⅓ or more of the distance Dc are arranged along the third direction D3 between the coil conductors C (coil conductors 21 to 26). Accordingly, the magnetic permeability can be improved. As a result, inductance improvement can be achieved in the multilayer coil component 1.

The magnetic permeability of the metal magnetic particles having a particle diameter exceeding ½ of the distance Dc is higher than the magnetic permeability of the metal magnetic particles MM having a particle diameter of ½ or less of the distance Dc. However, in a case where the metal magnetic particles having a particle diameter exceeding ½ of the distance Dc are arranged along the third direction D3 between the coil conductors C, lamination misalignment is likely to arise in the coil conductor C in the process of manufacturing the multilayer coil component 1. In a case where the lamination misalignment in the coil conductor C has arisen, the cross-sectional area of the magnetic path positioned inside the coil 20 may decrease and a decline in inductance may arise. In the multilayer coil component 1, the plurality of metal magnetic particles MM having a particle diameter of ½ or less of the distance Dc are arranged along the third direction D3 between the coil conductors C, and thus lamination misalignment is unlikely to arise in the coil conductor C. As a result, the multilayer coil component 1 suppresses a decline in inductance.

Although an embodiment of the present invention has been described above, the present invention is not necessarily limited to the embodiment described above and various modifications can be made without departing from the gist thereof.

In the cross section along the first direction D1 and the second direction D2, the area of the region where the metal magnetic particles MM are arranged along the facing direction of the conductor portion may be 50% or less of the area of the region between the conductor portions adjacent to each other. A configuration in which the area of the region where the metal magnetic particles MM are arranged along the facing direction of the conductor portion exceeds 50% of the area of the region between the conductor portions adjacent to each other in the cross section along the first direction D1 and the second direction D2 further suppresses a decline in insulation between the conductor portions as described above.

The number of the coil conductors C (coil conductors 21 to 29) is not limited to the value described above.

The coil axis Ax of the coil 20 may extend along the first direction D1. In this case, the magnetic body layers 7 are laminated in the first direction D1 and the coil conductors C (coil conductors 21 to 29) are separated from each other in the first direction D1.

The external electrode 4 may have only the electrode part 4*a* or may have only the electrode part 4*b*. Likewise, the external electrode 5 may have only the electrode part 5*a* or may have only the electrode part 5*b*.

What is claimed is:

1. A multilayer coil component comprising:

an element body containing a plurality of metal magnetic particles and a resin existing between the plurality of metal magnetic particles; and a coil disposed in the element body and configured to include a plurality of electrically interconnected coil conductors, wherein at least one of the plurality of coil conductors has a spiral shape and has conductor portions adjacent to each other when viewed from a direction along a coil axis of the coil, the conductor portion includes a straight conductor portion extending in a straight line and a connecting conductor portion connecting the straight conductor portion and constituting a corner portion of the coil conductor, and the metal magnetic particles between the connecting conductor portions adjacent to each other are lower in density than the metal magnetic particles between the straight conductor portions adjacent to each other.

2. The multilayer coil component according to claim 1, wherein the plurality of metal magnetic particles contained in the element body include a plurality of metal magnetic particles having a particle diameter of ⅓ or more and ½ or less of a distance between the straight conductor portions adjacent to each other, and the metal magnetic particles having the particle diameter are arranged along a facing direction of the straight conductor portions between the straight conductor portions adjacent to each other.

3. The multilayer coil component according to claim 2, wherein an area of a region where the metal magnetic particles having the particle diameter are arranged along the facing direction exceeds 50% of an area of a region between the straight conductor portions adjacent to each other in the facing direction in a cross section along the facing direction.

4. The multilayer coil component according to claim 3, wherein each of the straight conductor portion and the connecting conductor portion has a pair of side surfaces facing each other in the facing direction, and surface roughness of the pair of side surfaces is less than 40% of an average particle diameter of the plurality of metal magnetic particles contained in the element body.

5. The multilayer coil component according to claim 1, wherein the plurality of coil conductors are plated conductors.

6. The multilayer coil component according to claim 1, wherein the straight conductor portion includes a first conductor portion extending in a straight line along a first direction and a second conductor portion extending in a straight line along a second direction intersecting with the first direction, the first conductor portion is longer than the second conductor portion, and the metal magnetic particles between the first conductor portions adjacent to each other are lower in density than the metal magnetic particles between the second conductor portions adjacent to each other.

7. A multilayer coil component comprising:

an element body containing a plurality of metal magnetic particles and a resin existing between the plurality of metal magnetic particles; and a coil disposed in the element body and configured to include a plurality of electrically interconnected coil conductors, wherein at least one of the plurality of coil conductors has a spiral shape and has conductor portions adjacent to each other when viewed from a direction along a coil axis of the coil, the conductor portion includes a straight conductor portion extending in a straight line and a connecting conductor portion connecting the straight conductor portion and constituting a corner portion of the coil conductor, and magnetic permeability between the connecting conductor portions adjacent to each other is lower than magnetic permeability between the straight conductor portions adjacent to each other.

8. The multilayer coil component according to claim 7, wherein the plurality of metal magnetic particles contained in the element body include a plurality of metal magnetic particles having a particle diameter of ⅓ or more and ½ or less of a distance between the straight conductor portions adjacent to each other, and the metal magnetic particles having the particle diameter are arranged along a facing direction of the straight conductor portions between the straight conductor portions adjacent to each other.

9. The multilayer coil component according to claim 8, wherein an area of a region where the metal magnetic particles having the particle diameter are arranged along the facing direction exceeds 50% of an area of a region between the straight conductor portions adjacent to each other in the facing direction in a cross section along the facing direction.

10. The multilayer coil component according to claim 9 wherein each of the straight conductor portion and the connecting conductor portion has a pair of side surfaces facing each other in the facing direction, and surface roughness of the pair of side surfaces is less than 40% of an average particle diameter of the plurality of metal magnetic particles contained in the element body.

11. The multilayer coil component according to claim 7, wherein the plurality of coil conductors are plated conductors.

12. The multilayer coil component according to claim 7, wherein the straight conductor portion includes a first conductor portion extending in a straight line along a first direction and a second conductor portion extending in a straight line along a second direction intersecting with the first direction, the first conductor portion is longer than the second conductor portion, and the metal magnetic particles between the first conductor portions adjacent to each other are lower in density than the metal magnetic particles between the second conductor portions adjacent to each other.

* * * * *